(12) United States Patent
Thorpe et al.

(10) Patent No.: US 7,398,334 B1
(45) Date of Patent: Jul. 8, 2008

(54) CIRCUIT FOR AND METHOD OF REALIGNING DATA

(75) Inventors: Douglas E. Thorpe, Albuquerque, NM (US); Farrell L. Ostler, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 548 days.

(21) Appl. No.: 10/800,367

(22) Filed: Mar. 12, 2004

(51) Int. Cl.
*G06F 3/00* (2006.01)
*G06F 13/12* (2006.01)

(52) U.S. Cl. .............................. 710/29; 710/30; 710/33; 710/51; 710/65

(58) Field of Classification Search ................... 710/29, 710/54
See application file for complete search history.

(56) References Cited

U.S. PATENT DOCUMENTS 5,517,627 A * 5/1996 Petersen ..................... 710/316
6,112,297 A * 8/2000 Ray et al. ..................... 712/225
2001/0017859 A1 * 8/2001 Laubner et al. ............. 370/395
2003/0018837 A1 * 1/2003 Hussain et al. ................ 710/22

* cited by examiner

*Primary Examiner*—Alan S. Chen
(74) *Attorney, Agent, or Firm*—John J. King

(57) ABSTRACT

A circuit enabling the realignment of data is described. The circuit generally comprises an input multiplexer receiving a first plurality of input data bytes and a second plurality of input data bytes; a switching controller coupled to the input multiplexer and controlling the output of the data bytes from the input multiplexer; a delay register coupled to the input multiplexer and receiving predetermined bytes of the first plurality of input data bytes; and an output multiplexer coupled to the input multiplexer and the delay register. The output multiplexer receives the predetermined bytes of the first plurality of input data bytes and predetermined bytes of the second plurality of input data bytes.

12 Claims, 14 Drawing Sheets

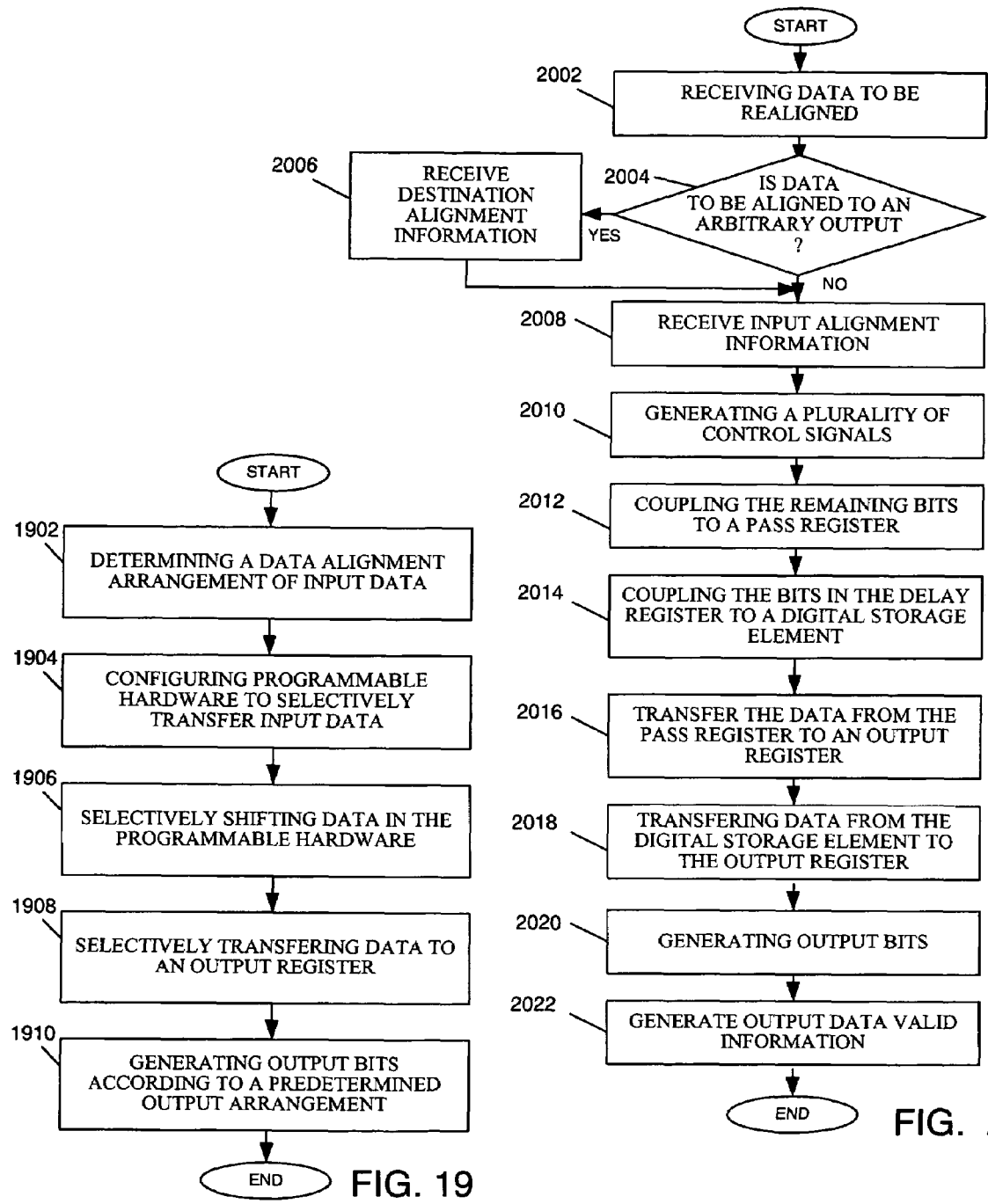

CIRCUIT FOR AND METHOD OF REALIGNING DATA

FIELD OF THE INVENTION

The present invention relates generally to electronic circuits, and in particular, to circuit for and method of realigning data.

BACKGROUND OF THE INVENTION

Programmable devices are a class of integrated circuits that can be configured for a wide variety of applications. With programmable logic devices (PLDs), designers can use inexpensive design tools to quickly develop, simulate and test their designs. A design can then be quickly programmed into a device and implemented. Another benefit of using PLDs is that during the design phase customers can change the circuitry as often as desired until the design operates to their satisfaction. Complex programmable logic devices (CPLDs) generally include a small number of logic gates, for example 10,000 logic gates, and provide a low cost, low power solutions employing programmable logic. CPLDs can be used in conjunction with other components such as memory or microprocessors to implement a function in an electronic device.

In contrast, field programmable gate arrays (FPGA) are high logic density programmable logic devices having built-in features such as a microprocessor, memory, clock management systems, and support for device-to-device signaling capabilities. FPGAs have become commonly used in telecommunication, Internet, switching and routing applications, and a wide variety of other applications requiring the transfer of large amounts of data. Generally, an FPGA includes a programmable logic fabric and a programmable input/output section. Typically, the programmable input/output section includes a number of serial/deserial transceivers to provide access to the programmable logic fabric. Such transceivers include a receiver section that receives incoming serial data and converts it into parallel data and a transmitter section that converts outgoing parallel data into an outgoing serial data stream.

Since FPGAs are used in a wide variety of applications which are implemented with a variety of operating systems, the operation of the FPGA can vary depending upon the operating system. For most data transfers in a microprocessor system, bursting of data in the native bus data width is the most efficient mechanism for transmitting data. Data that is part of a burst transfer (such as that used by direct memory access (DMA) devices) are generally transferred in ascending address order. Valid data bytes are adjacent to each other during any transfer cycle such that no invalid data bytes are between valid data bytes. A transfer cycle is either a single data beat transaction or a single burst transaction comprised of multiple data beats.

DMA transfers performed in hardware as part of a microprocessor system are often inefficient when the source and destination data buffers are not address aligned to the native data width of the microprocessor data bus. This data buffer alignment problem is often encountered when off-the-shelf operating systems, such as MontaVista Linux by Montavista Software and VxWorks 5.x by Wind River, are used. These operating systems, while quite popular with microprocessor system implementers, generally do not allow the end user to specify data buffer alignment within a system implementation. Such a realignment in a conventional microprocessor system requires the user to include additional programming to detect the unaligned buffer situation, and then employ the microprocessor to copy the unaligned buffer to an aligned buffer prior to initiating a DMA transfer of that buffer. Alternatively, users may opt to bypass the DMA function entirely in these situations. Another option (if the host bus supports it) is to employ a DMA function that will transfer data in bit widths that are less than the microprocessor data bus width but are guaranteed to meet all possible buffer alignment situations. However, this is extremely inefficient from a data throughput and system resource utilization perspective.

Accordingly, there is a need for an improved methodology of aligning data in an integrated circuit that incorporates or interfaces to a microprocessor based system.

SUMMARY OF THE INVENTION

According to one aspect of the invention, a circuit enabling the realignment of data is described. The circuit generally comprises an input multiplexer receiving a first plurality of input data bytes and a second plurality of input data bytes; a switching controller coupled to the input multiplexer and controlling the output of the input data bytes from the input multiplexer; a delay register coupled to the input multiplexer and receiving predetermined bytes of the first plurality of input data bytes; and an output multiplexer coupled to the input multiplexer and the delay register. The output multiplexer receives the predetermined bytes of the first plurality of input data bytes and predetermined bytes of the second plurality of input data bytes. According to alternate embodiments of the invention, circuits enabling the realignment of data from an arbitrary input to an arbitrary output and enabling the concatenation of groups of data are also described.

Methods of realigning data are also described. According to one embodiment, a method comprises the steps of determining a data alignment of input data comprising a plurality of input bytes; configuring hardware to selectively transfer input data; realigning the input data in the hardware based upon the data alignment of the input data; transferring realigned data to an output. According to alternate embodiments of the invention, methods of enabling the realignment of data from an arbitrary input to an arbitrary output and enabling the concatenation of groups of data in programmable logic devices are also described. While the circuits and methods of the present invention find particular application with programmable logic devices, the circuits and methods can be employed with any integrated circuit, such as application specific integrated circuits (ASICs).

BRIEF DESCRIPTION OF THE DRAWINGS

FIG. 19 is a flow chart showing a method of aligning data to a fixed alignment according to an embodiment of the present invention;

FIG. 20 is a flow chart showing a method of realigning data to an arbitrary alignment by employing ports and registers according to an embodiment of the present invention.

DETAILED DESCRIPTION OF THE DRAWINGS

The various circuits and methods of the present invention provide an on-the-fly data realignment function that will receive an arbitrarily byte aligned input data stream (such as a data stream of a microprocessor bus bit width) and realign it to a predetermined byte aligned output data stream of the same bit width. In addition, the circuits and methods enable an automatic operation mode whereby an incoming data stream alignment is detected and realigned to match the end of the last transfer to pass through the circuit. Such automatic operation enables a concatenation of multiple data transfers. Such a concatenation of data is highly useful when a DMA function is being used to build a large "super packet" of data that is composed of smaller DMA transfers from various source data buffers with each buffer having an arbitrary data alignment.

Figures 1, 2, 3:
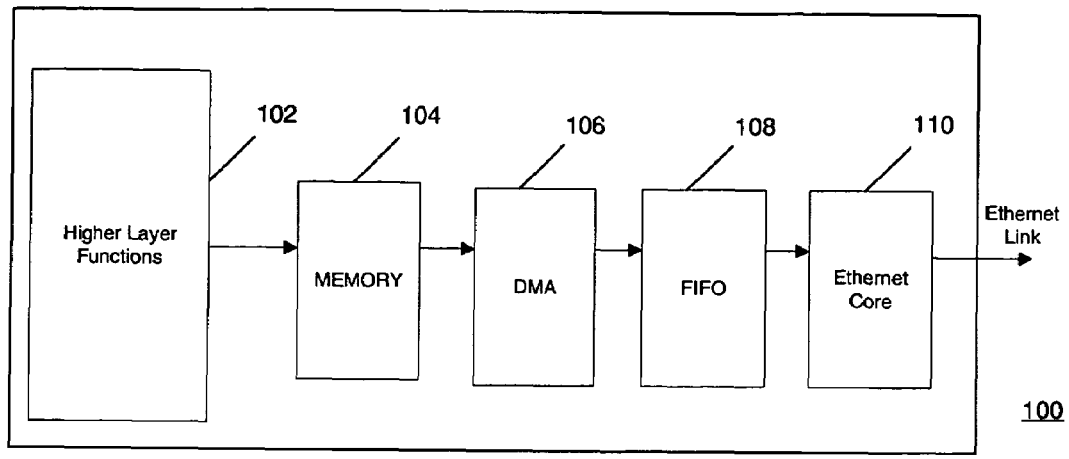
FIG. 1 is a block diagram of an integrated circuit enabling the realignment of data according to an embodiment the present invention.
FIG. 2 is an exemplary diagram showing unaligned data in a 64 bit wide data bus.
FIG. 3 is an exemplary diagram showing aligned data. in a 64 bit wide data bus.

Turning now to FIG. 1, a block diagram of a integrated circuit enabling the realignment of data according to an embodiment the present invention is shown. In particular, an integrated circuit 100, which could be a programmable logic device or an ASIC, having a high layer function block 102 comprises conventional functions of the device and is coupled to a memory 104. The memory 104 is coupled to and accessible by a DMA block 106. Generally, the high layer functions block 102 provides control signals, such as read and write requests to the FIFO 108. The FIFO 108 provides data alignment for high-speed data output, as will be described in more detail below. Finally, the data could be provided to an Ethernet core 110, for example, which couples data to an Ethernet link. While the data realignment engine (DRE) described in the remaining figures is preferably employed as a front-end for the FiFo 108, the engine could also be employed in the DMA block 106, or a combined DMA/FiFo arrangement.

Turning now to FIG. 2, an exemplary diagram shows unaligned data in a 64 bit wide data bus. A DMA data transfer in a microprocessor system requires data to be read from a source address and written to a destination address. In this example, the data bus is 64 bits wide and partitioned into eight byte lanes. The bus is capable of transferring 8 bytes of data in a single transfer cycle. The eight byte lanes are arranged in parallel to form the 64-bit wide data bus. A byte comprising 8 bits is generally the smallest addressable data element in a microprocessor system. These transfers are either a single data beat or a string of data beats (a burst transfer). When either the starting source address or the starting destination address (or both) do not match with the natural address partitioning boundary of a full width of the data bus, the transfer is unaligned, as shown for example in FIG. 2. In contrast, FIG. 3 shows aligned data in a 64 bit wide data bus. The simple case of realignment according to an embodiment of the present invention for a 64-bit data bus would be accepting a data transfer of arbitrary source alignment, such as shown in FIG. 2 and outputting the data aligned to the bus width, as shown in FIG. 3.

Figure 4:
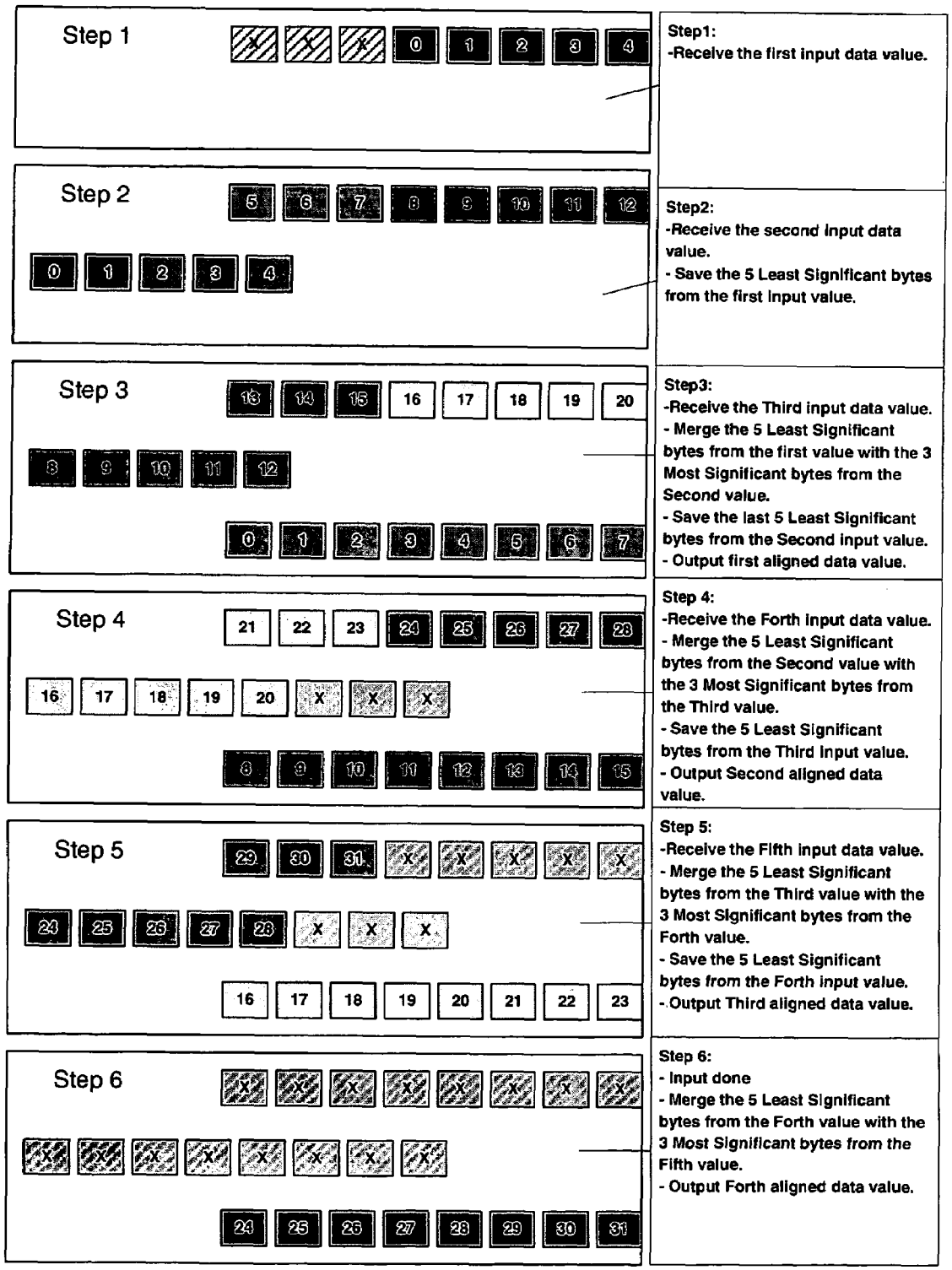
FIG. 4 is a diagram showing the steps in generating aligned data from unaligned data from the example of FIG. 2 according to an embodiment of the present invention.

Turning now to FIG. 4, a diagram shows the steps in generating aligned data from unaligned data for the example depicted in FIG. 2 according to an embodiment of the present invention. This process takes 6 steps to complete the realignment of the 32 bytes of data that are being transferred as a burst transfer cycle. Additional insight can be obtained by examining the movement of each byte of data through the process. A first input data value is received at a step 1. A second input data value is then received and the five least significant bytes from the first input value are saved at a step 2. A third input data value is received at a step 3, and the five least significant bytes from the first value are merged with the three most significant bytes from the second value. The last five least significant bytes from the second input value are then saved, and the first aligned data value is output. A fourth input data value is received at a step 4. The five least significant bytes from the second value are merged with the three most significant bytes from the third value. The five least significant bytes from the third input value are saved and second aligned data value is output. The fifth input data value is received at a step 5. The five least significant bytes from the third value are merged with the three most significant bytes from the fourth value. The five least significant bytes from the fourth input value are saved. The third aligned data value is then output. The input is completed at a step 6. The five least significant bytes from the fourth value are merged with the three most significant bytes from the fifth value. The fourth aligned data value is then output. Analyzing the data byte movement through the process indicates that a generalized implementation would require three switch points and a storage element. In addition, a logic function is required to translate the alignment scenario into control and timing that is needed for a digital logic implementation, as will be described in more detail in reference to the remaining figures.

Figure 5:
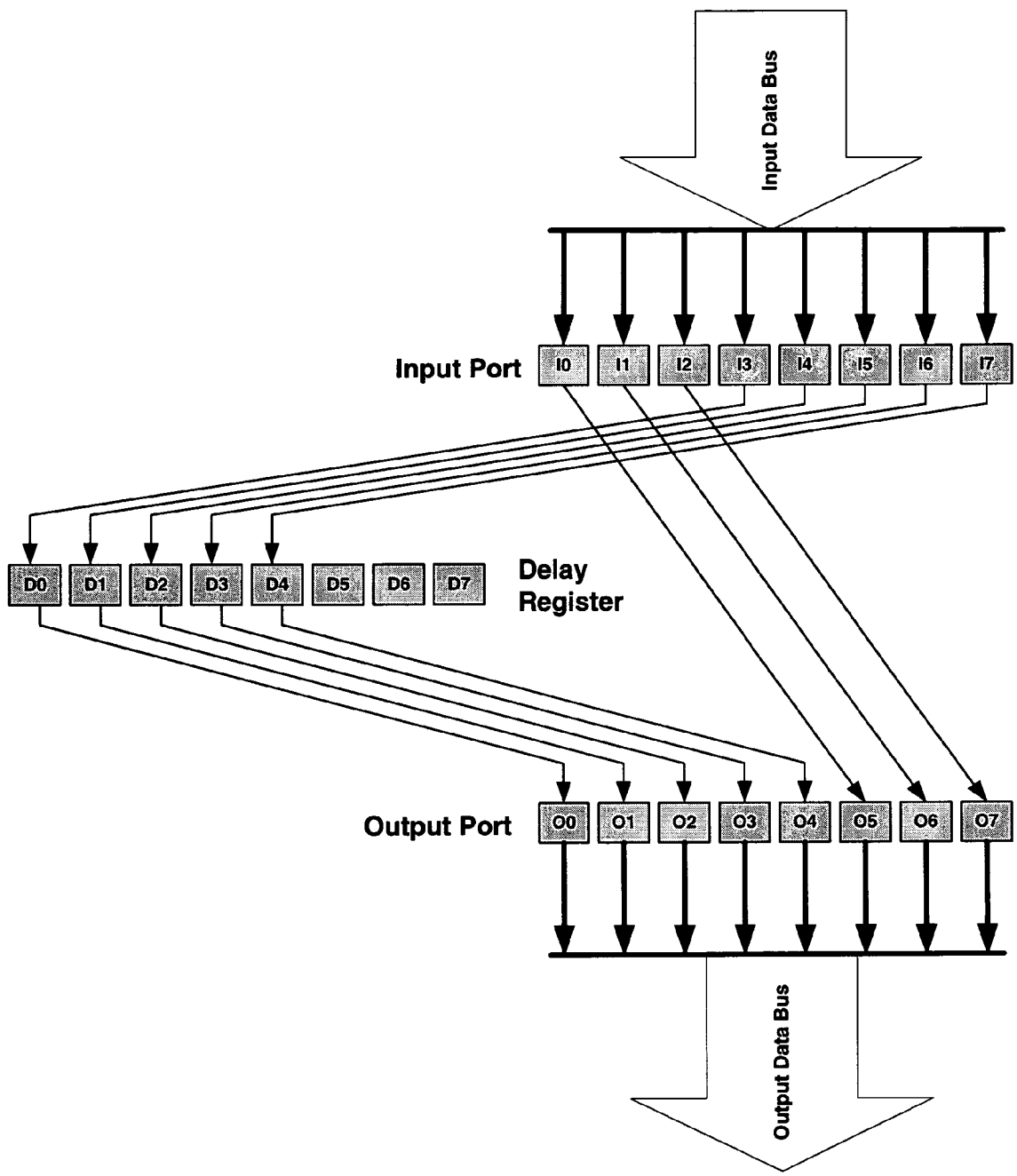
FIG. 5 is a diagram showing an arrangement of registers and signal interconnection supporting the realignment steps of FIG. 4 for transferring data according to an embodiment of the present invention.

Turning now to FIG. 5, a diagram shows an arrangement of ports and registers, as it applies to the sequence detailed in FIG. 4, for transferring data according to an embodiment of the present invention. As described above, data that is part of a burst transfer such as that used by DMA devices is transferred in ascending address order. Therefore, in the examples set forth below, the transfer of data is shown in ascending order. FIG. 5 shows the transfer of data from an input port to a delay register and an output port. In particular, depending upon the alignment of the data in a group of input data, certain bytes of the input multiplexers are coupled to a delay register, while the remaining bytes are coupled to the output port. In the example of FIG. 5, input bytes I0 through I2 are coupled to an output port, while input bytes I3 through I5 are coupled to the delay register. Depending upon the alignment of the input data, there are eight possible scenarios for transferring data from an input port to an output port using a delay register, as will be discussed in FIGS. 6-13. Circuits for enabling the transfer of data as described in FIGS. 6-13 will be described in detail in reference to FIGS. 14-18.

Figure 6:
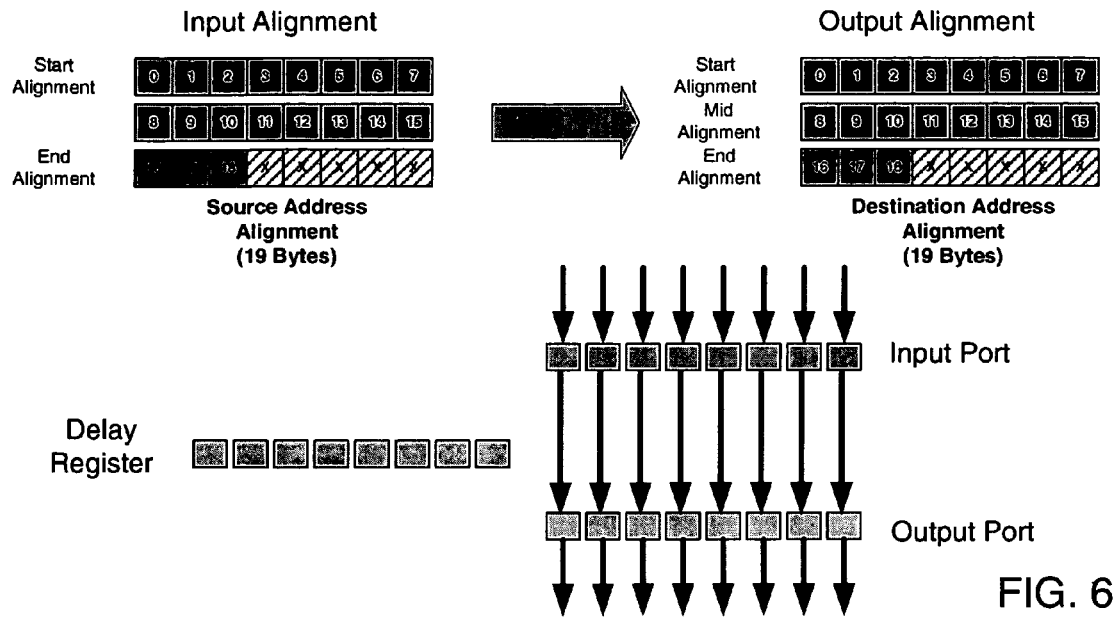
FIG. 6 is a diagram showing the register and data path relationship for the transfer of data having a first alignment to a fixed output employing the arrangement of ports and registers of FIG. 5.
Figure 7:
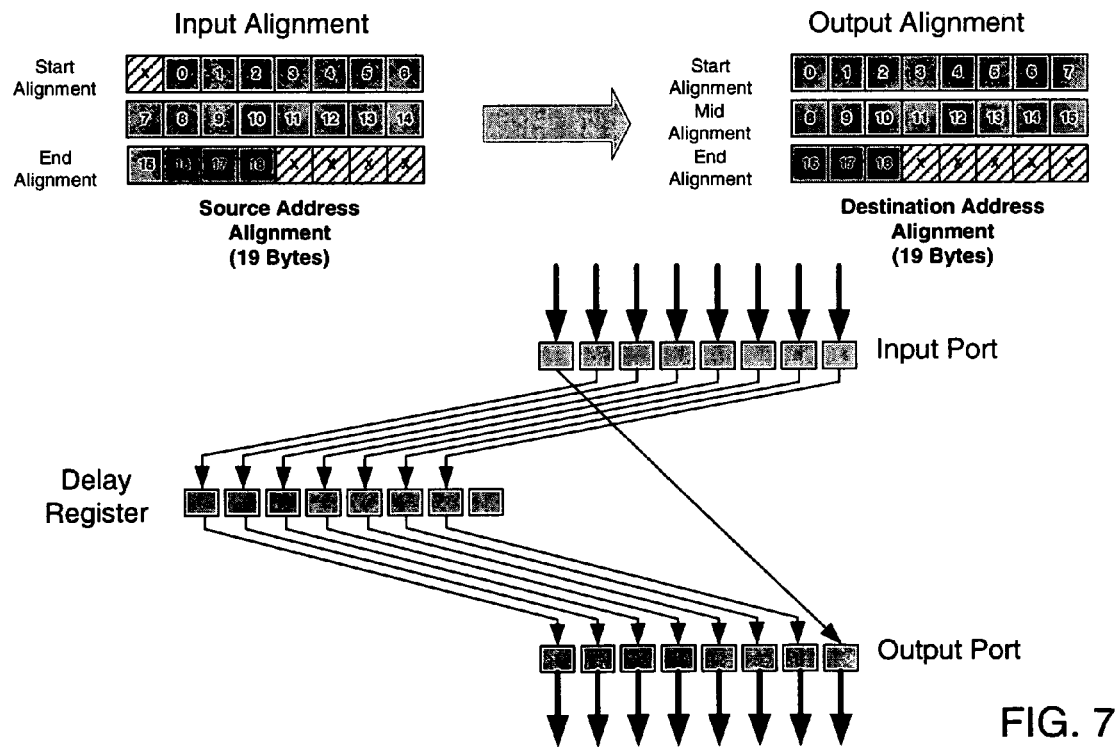
FIG. 7 is a diagram showing the register and data path relationship for the transfer of data having a second alignment to a fixed output employing the arrangement of ports and registers of FIG. 5.

Turning now to FIG. 6, a diagram shows the transfer of data (19 bytes) having a first alignment to a fixed (aligned) output employing the arrangement of input and output ports and a register interconnect depicted by the figure. As shown in FIG. 6, the input data is aligned, so all of the data bytes in the input port are transferred directly to the output port. As shown in FIG. 7, because the input data is not aligned, and therefore the data is transferred so that it is aligned at the output. In particular, because the first input byte does not include valid data, the remaining 7 input bytes (having data bytes O through 6) are transferred to the delay register. A second group of bytes (having data bytes 7-14) are then loaded into the input port. Because the first group of data bytes only included 7 bytes, one additional byte of the second group of data bytes is transferred to the output port with the 7 data bytes of the first group of data bytes. That is, bytes 0-6 from the first group of data (stored in the delay register) is combined with the first byte of the second group of data. As can be seen, the order of the data in the output port is also arranged so that the bytes are arranged in ascending order.

Figure 8:
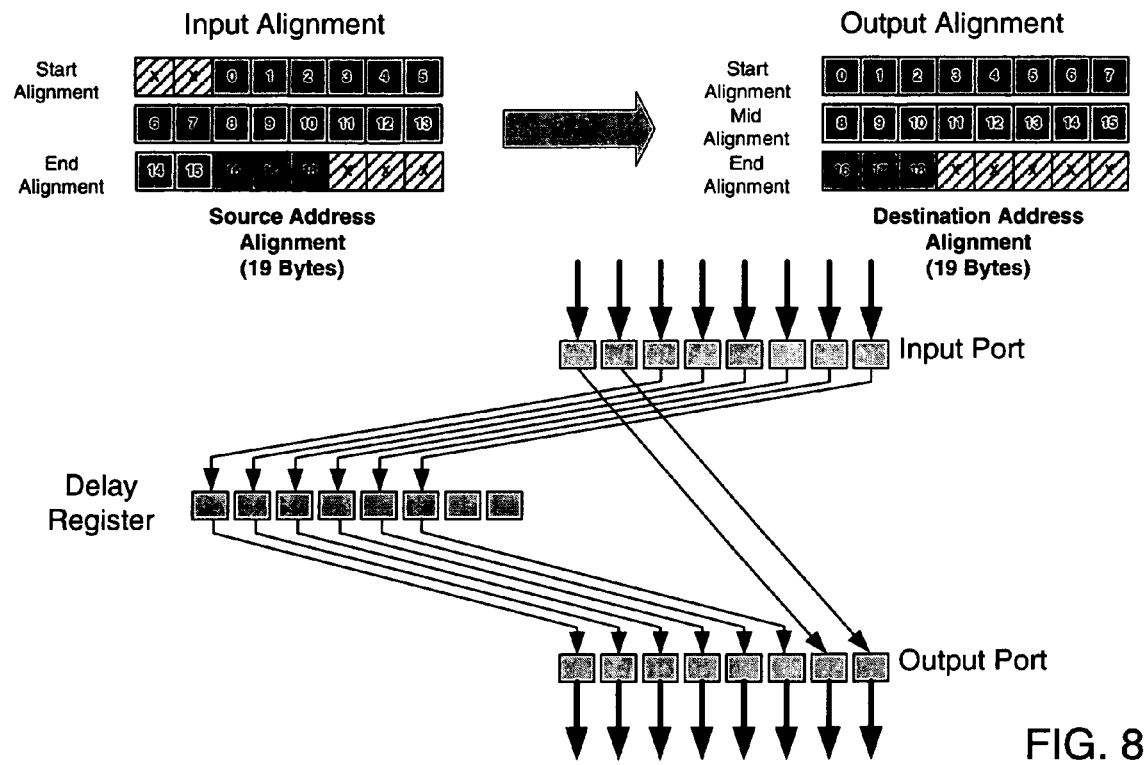
FIG. 8 is a diagram showing the register and data path relationship for the transfer of data having a third alignment to a fixed output employing the arrangement of ports and registers of FIG. 5.

As shown in FIG. 8, a diagram shows the transfer of data having a third alignment to a fixed output employing the arrangement of input and output ports and a register interconnected as depicted by the figure. This particular transfer scenario matches that of FIG. 5. Based upon the arrangement of the input data in FIG. 8, the 6 input bytes (having data bytes 0 through 5) are transferred to the delay register. A second group of bytes (having data bytes 6-13) are then loaded into the input port. Because the first group of data bytes only included 6 bytes, two additional bytes of the second group of data bytes are transferred to the output, port with the 6 data bytes of the first group of data bytes. That is, bytes 0-5 from the first group of data (stored in the delay register) is combined with the first two bytes of the second group of data and arranged in ascending order.

Figure 9:
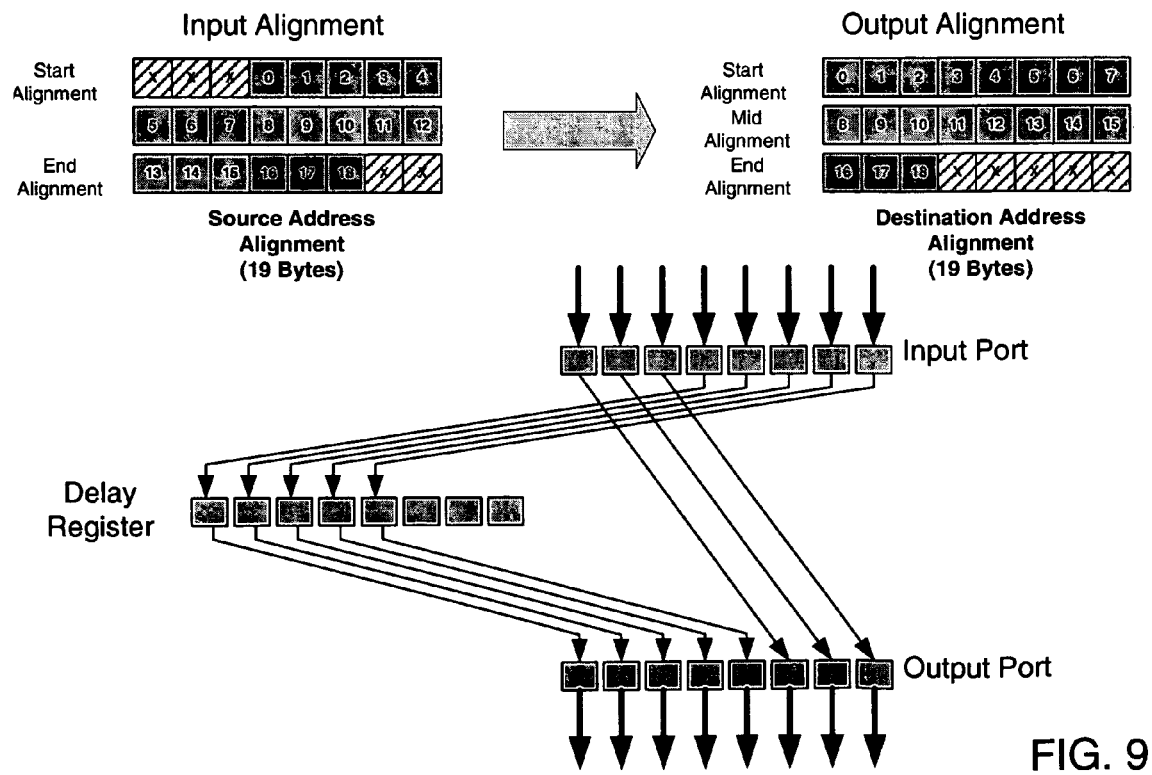
FIG. 9 is a diagram showing the register and data path relationship for the transfer of data having a fourth alignment to a fixed output employing the arrangement of ports and registers of FIG. 5.

As shown in FIG. 9, a diagram shows the transfer of data having a fourth alignment to a fixed output employing the arrangement of input and output ports and a register interconnected as depicted by the figure. Based upon the arrangement of the input data in FIG. 9, the 5 input bytes (having data bytes 0 through 4) are transferred to the delay register. A second group of bytes (having data bytes 5-12) are then loaded into the input port. Because the first group of data bytes only included 5 bytes, three additional bytes of the second group of data bytes are transferred to the output port with the 5 data bytes of the first group of data, bytes. That is, bytes 0-4 from the first group of data (stored in the delay register) is combined with the first three bytes of the second group of data and arranged in ascending order.

Figure 10:
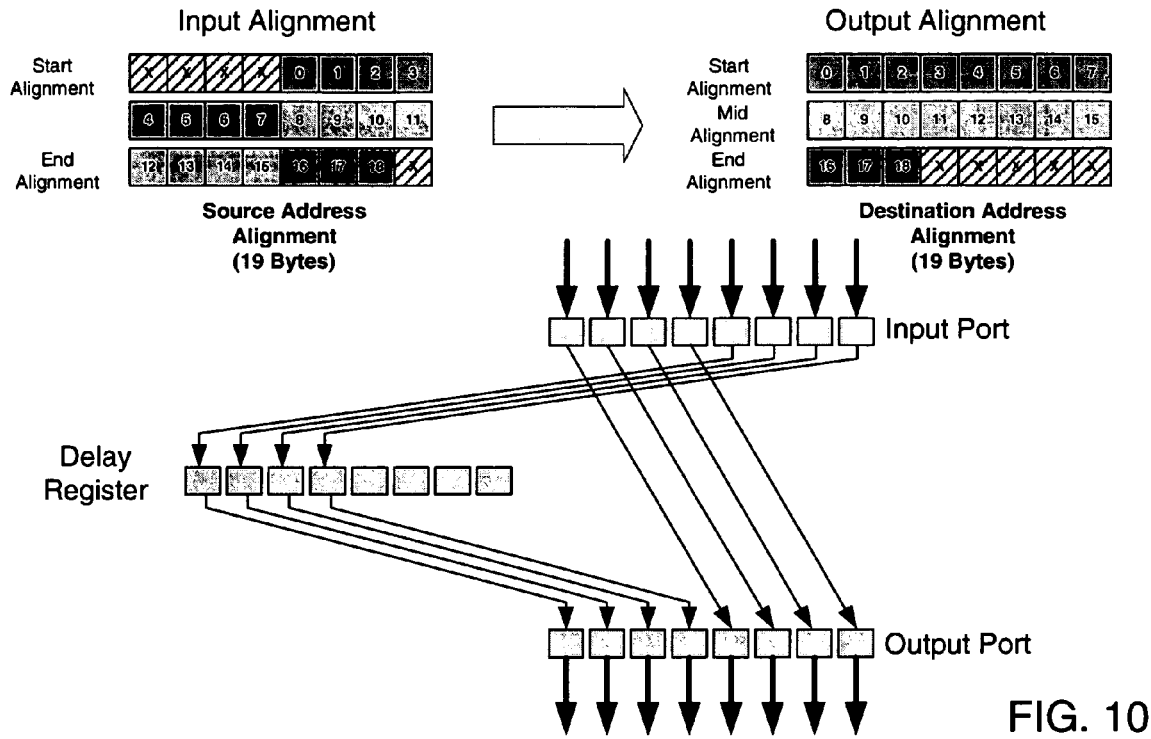
FIG. 10 is a diagram showing the register and data path relationship for the transfer of data having a fifth alignment to a fixed output employing the arrangement of ports and registers of FIG. 5.

As shown in FIG. 10, a diagram shows the transfer of data having a fifth alignment to a fixed output employing the arrangement of input and output ports and a register interconnected as depicted by the figure. Based upon the arrangement of the input data in FIG. 10, the 4 input bytes (having data bytes 0 through 3) are transferred to the delay register. A second group of bytes (having data bytes 4-11) are then loaded into the input port. Because the first group of data bytes only included 4 bytes, four additional bytes of the second group of data bytes are transferred to the output port with the 4 data bytes of the first group of data bytes. That is, bytes 0-3 from the first group of data (stored in the delay register) is combined with the first four bytes of the second group of data and arranged in ascending order.

Figure 11:
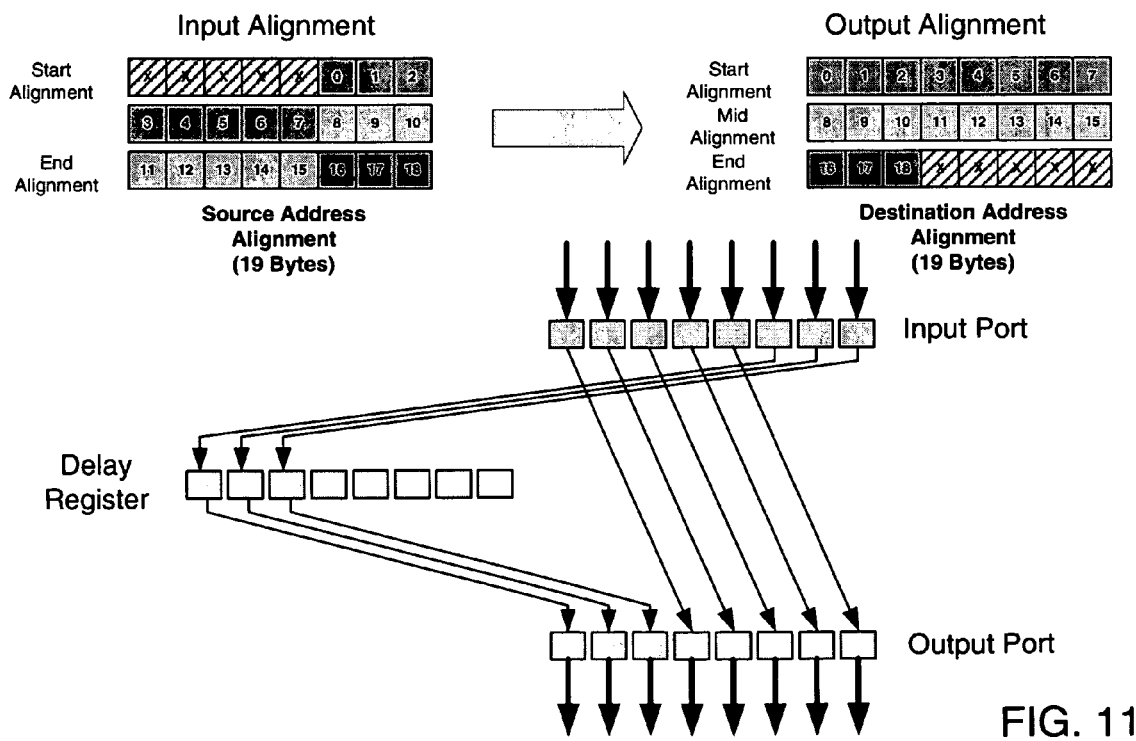
FIG. 11 is a diagram showing the register and data path relationship for the transfer of data having a sixth alignment to a fixed output employing the arrangement of ports and registers of FIG. 5.

As shown in FIG. 11, a diagram shows the transfer of data having a sixth alignment to a fixed output employing the arrangement of input and output ports and a register interconnected as depicted by the figure. Based upon the arrangement of the input data in FIG. 11, the 3 input bytes (having data bytes 0 through 2) are transferred to the delay register. A second group of bytes (having data bytes 3-10) are then loaded into the input port. Because the first group of data bytes only included 3 bytes, 5 additional bytes of the second group of data bytes are transferred to the output port with the 3 data bytes of the first group of data bytes. That is, bytes 0-2 from the first group of data (stored in the delay register) is combined with the first 5 bytes of the second group of data and arranged in ascending order.

Figure 12:
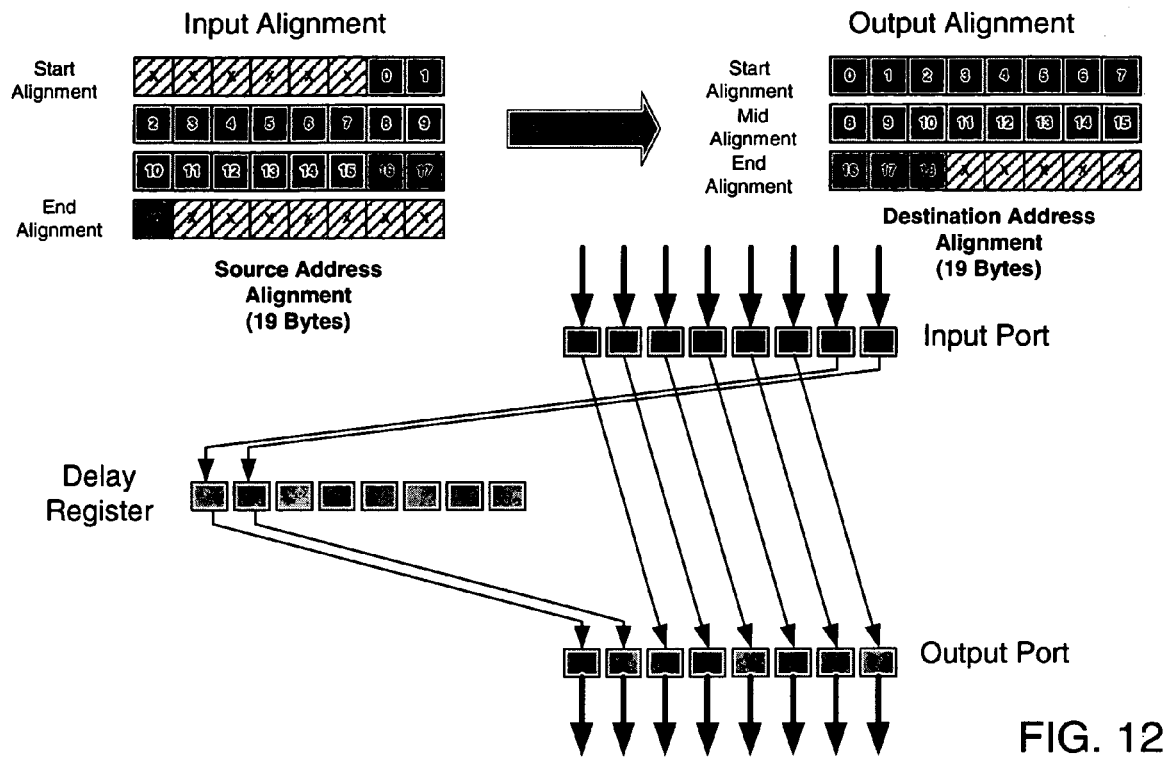
FIG. 12 is a diagram showing the register and data path relationship for the transfer of data having a seventh alignment to a fixed output employing the arrangement of ports and registers of FIG. 5.

As shown in FIG. 12, a diagram shows the transfer of data having a seventh alignment to a fixed output employing the arrangement of input and output ports and a register interconnected as depicted by the figure. Based upon the arrangement of the input data in FIG. 12, the 2 input bytes (having data bytes 0 through 1) are transferred to the delay register. A second group of bytes (having data bytes 2-9) are then loaded into the input port. Because the first group of data bytes only included 2 bytes, six additional bytes of the second group of data bytes are transferred to the output port with the 2 data bytes of the first group of data bytes. That is, bytes 0-1 from the first group of data (stored in the delay register) is combined with the first six bytes of the second group of data and arranged in ascending order.

Figure 13:
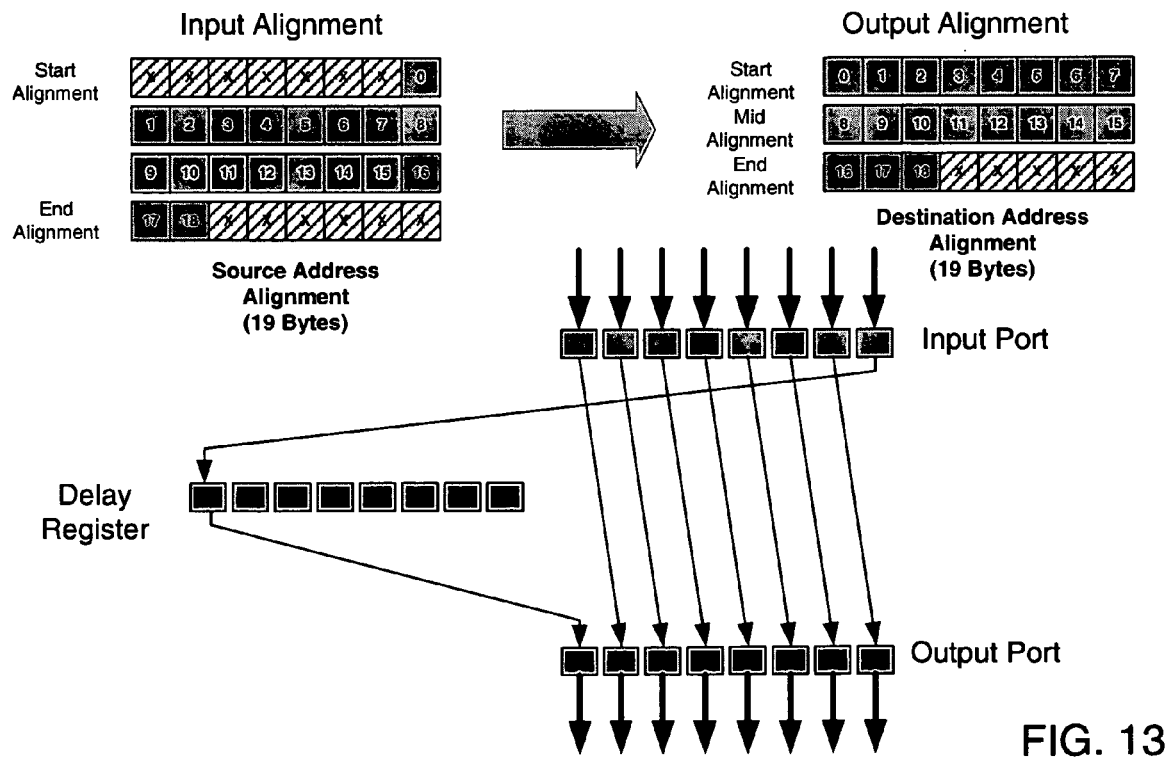
FIG. 13 is a diagram showing the register and data path relationship for the transfer of data having an eighth alignment to a fixed output employing the arrangement of ports and registers of FIG. 5.

As shown in FIG. 13, a diagram shows the transfer of data having an eight alignment to a fixed output employing the arrangement of input and output ports and a register interconnected as depicted by the figure. Based upon the arrangement of the input data in FIG. 13, the first input byte is transferred to the delay register. A second group of bytes (having data bytes 1-8) are then loaded into the input port. Because the first group of data bytes only includes 1 byte, 7 additional bytes of the second group of data bytes are transferred to the output port with the data byte of the first group of data bytes. That is, byte 0 from the first group of data (stored in the delay register) is combined with the first seven bytes of the second group of data and arranged in ascending order.

Figure 14:
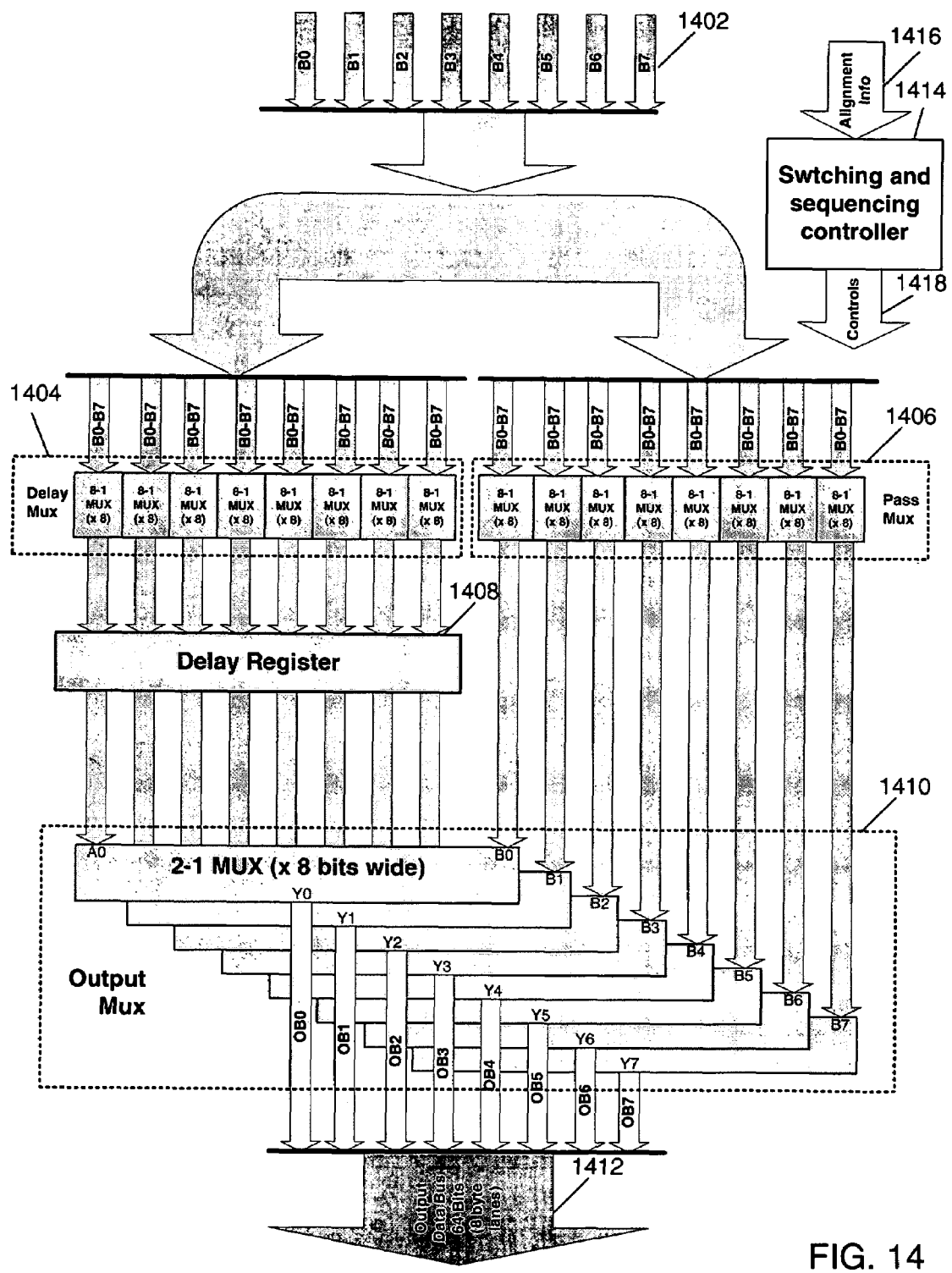
FIG. 14 is a block diagram of a generalized data realignment engine for implementing the required register and data path arrangements of FIG. 6 through FIG. 13 according to one embodiment of the present invention.

Turning now to FIG. 14, a more detailed block diagram of a generalized data realignment engine (DRE) for implementing the transfer of data based upon the alignment of input data shown in FIGS. 6-13 is shown. The fundamental structure of the embodiment of FIG. 14 comprises an input port, three banks of multiplexers, a storage element for digital delay purposes, and an output port. While the particular arrangement of FIG. 14 is applicable to a device having a 64-bit data bus, a 64-bit data bus is merely given by way of example, and the various embodiments of the present invention could be adapted to other data buses or data transfer applications.

The input data bus 1402 feeds two multiplexers, a delay multiplexer 1404 and a pass multiplexer 1406, each allowing data on an input byte lane to be switched to any other byte lane position. These multiplexers preferably comprise eight multiplexers that are each an 8-1 multiplexer, where each 8-1 multiplexer is 8 bits wide (for a 64-bit wide bus having 8 byte lanes). The relative position of a data bit within a byte lane is preferably maintained throughout the structure, regardless of the byte lane routing. The delay multiplexer 1404 feeds a delay register 1408. The pass multiplexer 1406 feeds the output multiplexer 1410 which generates output data bits 1412. The output data bits are based on a combination of delayed data from the delay register 1408 or non-delayed data from the pass multiplexer 1406. Multiplexer configuration and process sequencing is generated by a switching and sequence controller 1414. The controller 1414 requires as an input the starting alignment 1416 of the incoming data stream for the transfer cycle in order to correctly transfer the data as shown in FIGS. 5-13. The controller generates the necessary timing and logic states for the DRE control signals 1418, which control the delay multiplexer 1404, the pass multiplexer 1406, and the output multiplexer 1410. That is, each input alignment requires a different shifting configuration. These shifting configurations satisfy the initial requirement of arbitrary input alignment to 64-bit output alignment.

Figure 15:
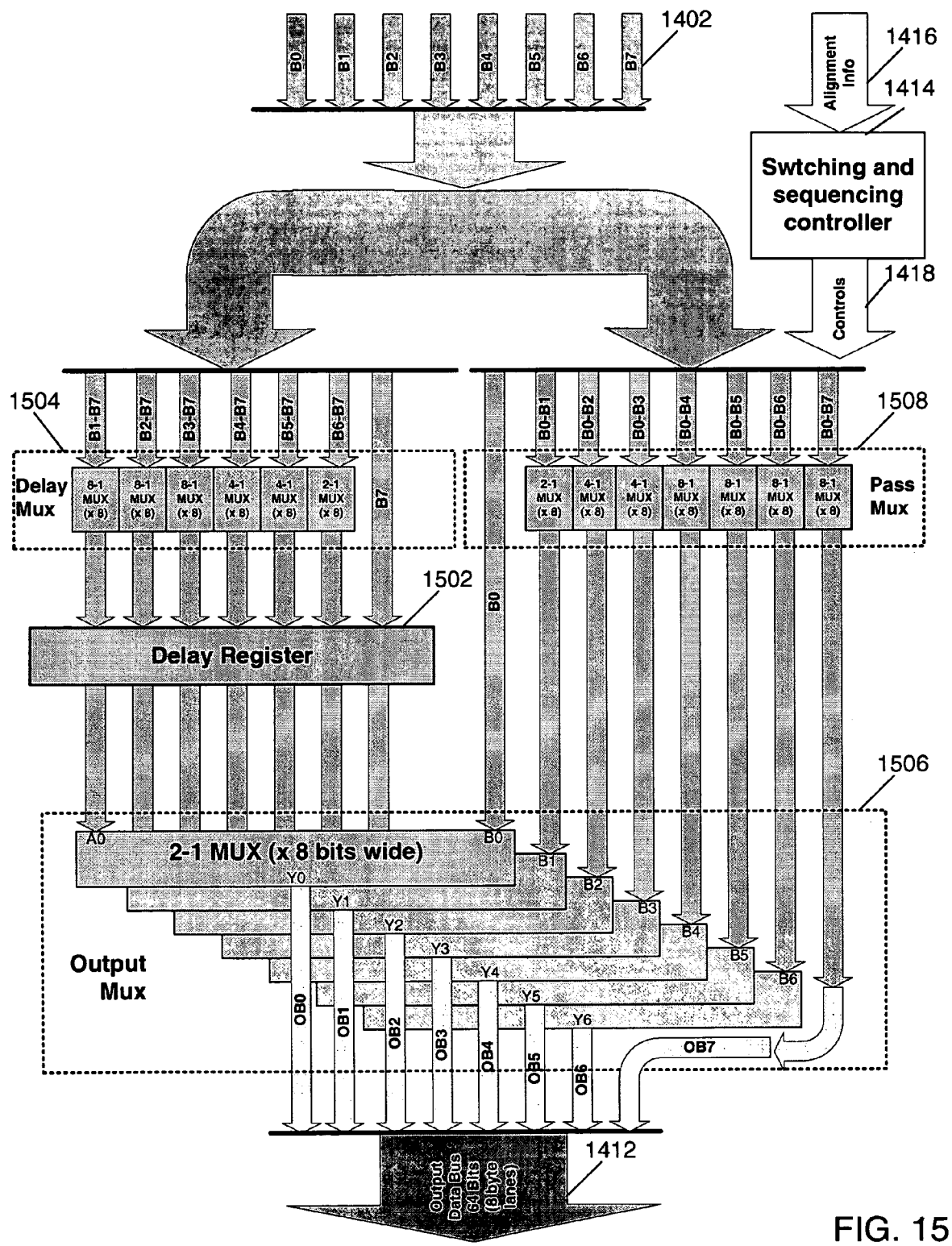
FIG. 15 is a block diagram of a resource optimized data realignment engine for implementing the register and data path arrangements of FIG. 6 through FIG. 13 according to an alternate embodiment of the present invention.

Turning now to FIG. 15, a block diagram for implementing an optimized arrangement of FIG. 14 according to an alternate embodiment of the present invention is shown. One of the drawbacks with the fundamental architecture of FIG. 14 is the large number of hardware resources required. An optimization analysis can be applied to the fundamental architecture of FIG. 14 to modify its design, resulting in the optimized architecture that is shown in FIG. 15. The primary resource consuming elements are the sixteen 8-1 multiplexer segments which are each 8 bits wide. Resource conservation becomes even more important in digital systems that have bi-directional data flow. For optimum system throughput, multiple realignment functions would be required, one for each data flow direction. A thorough examination of the eight shifting configurations that are required for the data realignment engine (FIG. 6-FIG. 13) reveals optimizations that can be made to reduce the resource requirement. For example, because the least significant (right most) segment of the delay register 1408 is never used, a delay register segment and the corresponding segment of the delay multiplexer can be eliminated, resulting in the delay register 1502 and the delay multiplexer 1504. This modification also eliminates one of the 2-1 multiplexer segments required in the output multiplexer, resulting in the output multiplexer 1506. In addition, input byte lane B7 does not require switching prior to entering the delay register. This further reduces the resources of the delay multiplexer 1504. Input byte lane B0 can be passed directly through to the output multiplexer 1506, resulting in the pass multiplexer 1508 and the final data output bus 1412.

Another optimization pattern that is observed with the pass multiplexer and the delay multiplexer is that the number of inputs to a multiplexing segment is different depending on the assigned byte lane position. For the delay multiplexer 1504, the input requirement starts at 1 for the most significant multiplexer segment and increases by 1 for each segment position moving towards the least significant segment. The pass multiplexer 1508 has the same characteristic but in the opposite direction (i.e. least significant to most significant). In general, a 2-1 multiplexer uses half the resources of a 4-1 multiplexer, which in turn uses half of the resources of an 8-1 multiplexer. Additionally, a multiplexer with a single input can be replaced with a direct connection between the input and output without loss of function. Through the application of simple algebra, the optimized architecture of FIG. 15 would be expected to consume 37% fewer multiplexing resources than the fundamental architecture of FIG. 14. In addition, the delay register requirement is reduced by one byte lane segment.

Figure 16:
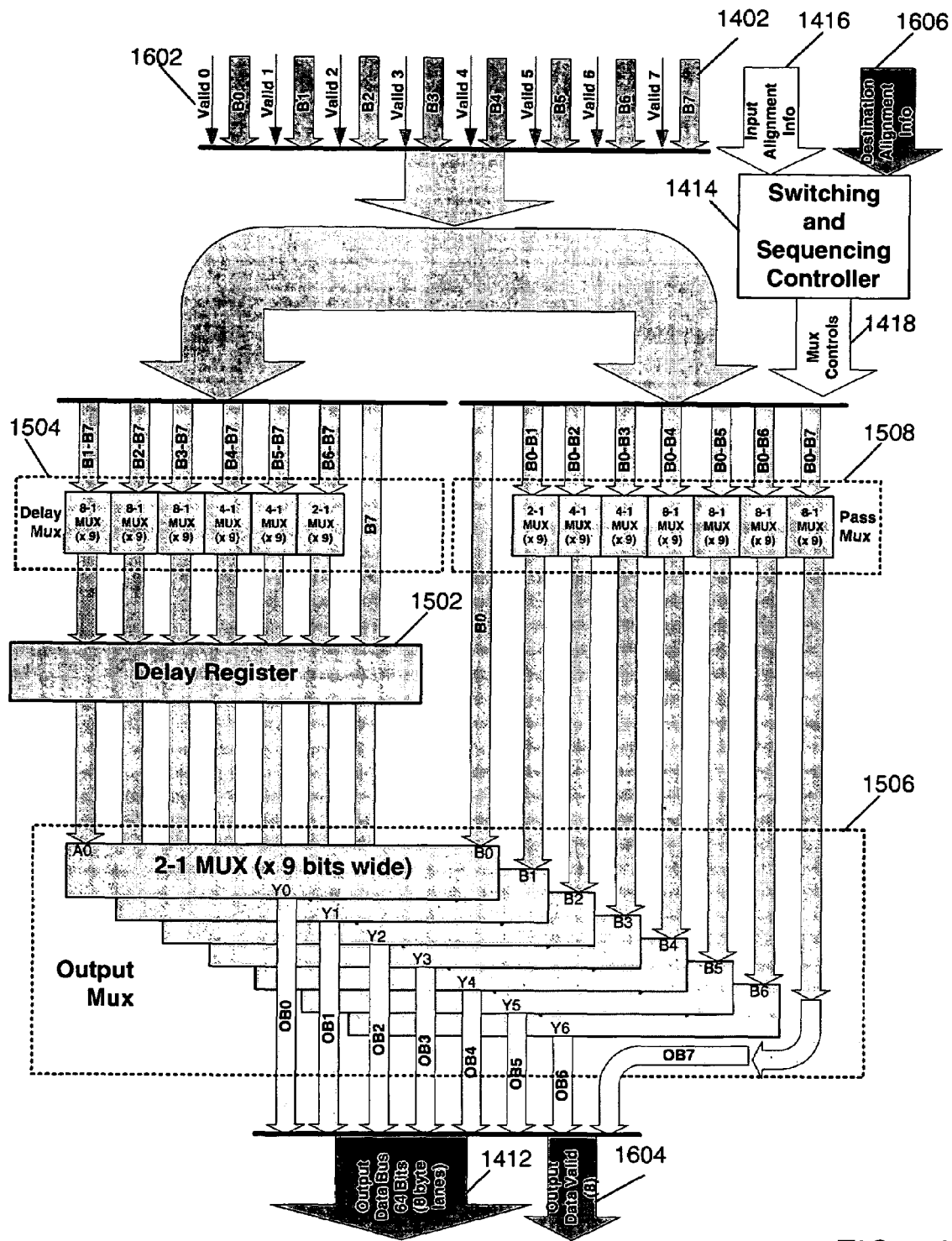
FIG. 16 is a block diagram of a resource optimized data realignment engine for implementing the arrangement of FIG. 6 through FIG. 13 according to alternate embodiment of the present invention enabling the transfer of data from an arbitrary arrangement to an arbitrary arrangement.

Turning now to FIG. 16, a block diagram for implementing the arrangement of FIG. 5 according to alternate embodiment of the present invention enabling the transfer of data from an arbitrary arrangement to an arbitrary arrangement is shown. The embodiment of FIG. 16 enables data to be realigned to an arbitrary output alignment. In the 64-bit bus scenario, this embodiment of FIG. 16 increases the number of the shift cases from the original eight previously examined to sixty four cases. Although it would appear that these added shift cases would force the realignment architecture back to the more general fundamental architecture with additional multiplexers, and may even add functions to it, upon detailed examination of each of the 64 arbitrary to arbitrary realignment cases, the optimized architecture of the embodiment of FIG. 15 still applies. However, two minor adjustments are needed to enable the transfer of data from an arbitrary arrangement to an arbitrary arrangement. The first adjustment needed is to add a byte data valid indicator 1602 for each byte lane supported by the invention. The byte data valid indicators are passed through the realignment process in parallel with the associated byte lane data. These indicators are generally available with most data buses and are provided in parallel with the input data. When the realigned data is at the output 1412, output data valid bits 1604 indicate to the destination user logic which output byte lanes have valid data present after the realignment process has been completed for that data beat. This is easily implemented by adding one additional bit to each multiplexer segment and delay register segment. The other necessary adjustment to the Optimized Architecture is the expansion of the Switching and Sequence Controller to provide for the additional destination alignment information 1606 along with the input alignment information 1416, expanding the input alignment information bus from 3 bits to 6 bits.

Figure 17:
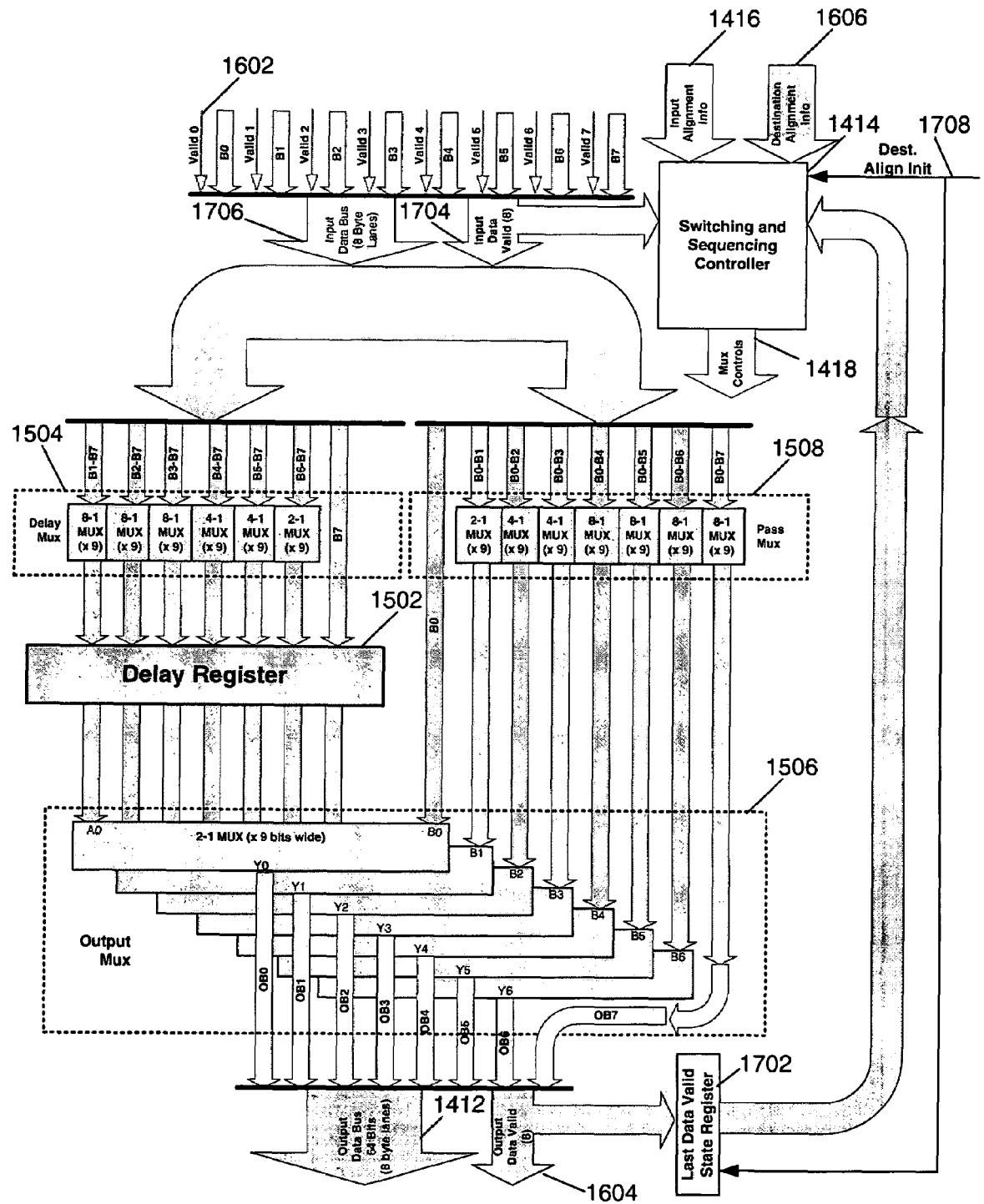
FIG. 17 is a block diagram of a resource optimized data realignment engine for implementing the arrangement of FIG. 6 through FIG. 13 according to alternate embodiment of the present invention enabling concatenation of groups of data.

Turning now to FIG. 17, a block diagram for implementing the arrangement of FIG. 16 according to alternate embodiment of the present invention enabling concatenation of groups of data is shown. The realignment function can be enhanced yet again by supporting data transfer concatenation. This enhancement is useful in digital system applications where a sequence of burst data transfers from different data buffer sources and alignments need to be concatenated together to form a single contiguous data packet. A typical example of this concatenation is the formation of an Ethernet transmit data packet that consists of header information and various data buffer sub-packets. This concatenation process is performed in a conventional device by a software application which copies the packet data into an intermediate data buffer. However, the concatenation function can be added by leveraging off of the arbitrary to arbitrary realignment feature of FIG. 16. The concatenation function can be implemented by incorporating an additional memory element and some decoding logic. As shown in FIG. 17, the memory element comprises a last data valid state register 1702 that retains the state of the last data valid indicators 1604 to pass through the output multiplexer 1506.

The switching and sequencer controller 1414 is also modified to accept the output of the last data valid state register 1702 and the data valid indicators 1704 from the input data bus 1706. With this information, the switching and sequencing controller can determine the input data alignment case and the new destination alignment case, and automatically configure the delay multiplexer and pass multiplexer for the ensuing data transfer. The alignment case only has to be determined at the initiation of a transfer cycle and then held until the completion of the cycle. Finally, a destination alignment initialization signal 1708 allows the user logic to reset the last data valid state register and the switching and sequencer controller. The destination alignment initialization signal 1708 is asserted by the user whenever the destination alignment of a transfer cycle needs to be initialized to the native alignment of the data bus. For example, the destination alignment initialization signal is asserted when a new data packet is about to be built using the data realignment engine function.

Figure 18:
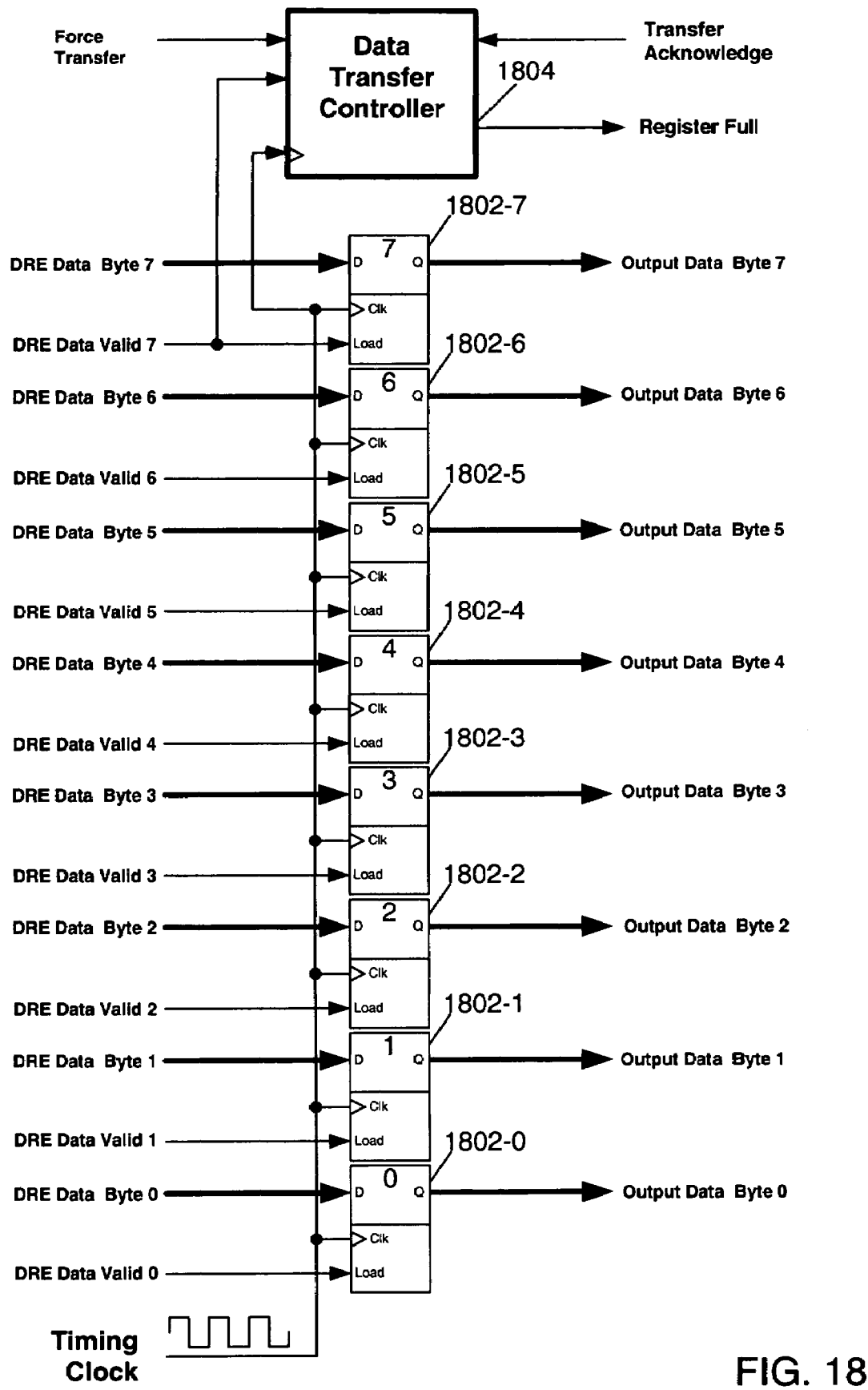
FIG. 18 is a block diagram of an interface circuit enabling the concatenation of groups of data according to an embodiment of FIG. 17.

Turning now to FIG. 18, a block diagram of an interface circuit, such as a 64-bit interface circuit for receiving the outputs 1412 and 1604 of the output multiplexer 1506, enabling the concatenation of groups of data according to an embodiment of FIG. 17, is shown. The circuit is preferably a digital register (registers 1802-0 to 1802-7) that comprises byte wide input register segments (DRE data byte 0 to 8) that can be independently loaded. Each output byte lane of the output multiplexer 1506 is connected to the corresponding input register segment of the registers 1802-0 to 1802-7. The load control of each register 1802-0 to 1802-7 is connected to the corresponding data valid output indicator (DRE data valid 0 to 8). This configuration allows the collection and holding of the output data (output data byte 0 to 7) until a full 64-bit data value has been collected. Once a complete data value is received in the register, the value can then be transferred to some other digital storage device such as a FIFO, a memory, or another register.

A synchronous control circuit is incorporated to detect when the register is full, and then coordinates the transfer of the data value to another digital storage device. A data transfer controller 1804 senses when byte segment 7 is loaded by the data realignment engine based upon the knowledge that the register will always be filled in ascending byte lane order. When byte lane 7 is loaded in the register, the data transfer controller asserts the 'Register Full' indicator, which is a signal to receiving digital device that a data transfer can occur. The receiving device then samples and stores the outputs of the register. The receiving device also preferably asserts a 'Transfer Acknowledge' signal that is input to the data transfer controller. The data transfer controller responds by de-asserting the 'Register Full' signal. When the 'Register Full' signal is not asserted, the receiving digital device knows that the register's output data is stale or not yet ready to be sampled. The 'Data Transfer Controller' also preferably provides a means for forcing a transfer from the register to the receiving digital device via the assertion of the input signal named 'Force Transfer'. A forced transfer is required due to the high probability that a series of data transfers through the data realignment engine will result in a last output of the data output register that will not completely fill all byte segments of the register.

Turning now to FIG. 19, a flow chart shows a method of aligning data according to an embodiment of the present invention. The method of FIG. 19, or the methods of FIGS. 20 and 21, could be performed using any of the data realignment engines described above. In particular, a data alignment arrangement of input data is determined at a step 1902. Programmable hardware is then configured to selectively transfer the input data at a step 1904. Data is then selectively shifted in the programmable hardware at a step 1906. The data is then transferred to an output register at a step 1908. The output bits are generated according to a predetermined output arrangement at a step 1910.

Turning now to FIG. 20, a flow chart shows a method of realigning data by employing registers according to an embodiment of the present invention. Data to be realigned is received at a step 2002. It is then determined whether the data to be realigned is to be aligned to an arbitrary output at a step 2004. If so, destination alignment information is received at a step 2006. Input alignment information is then received at a step 2008. A plurality of control signals are then generated at a step 2010. The remaining bits are coupled to pass register at a step 2012. The bits in the delay register are coupled to a digital storage element at a step 2014. The data from the pass register is transferred to an output register at a step 2016. The data from the digital storage element is also transferred to the output register at step 2018. Output bits are generated at a step 2020. Finally, output data valid information is then generated at a step 2022.

Figure 21:
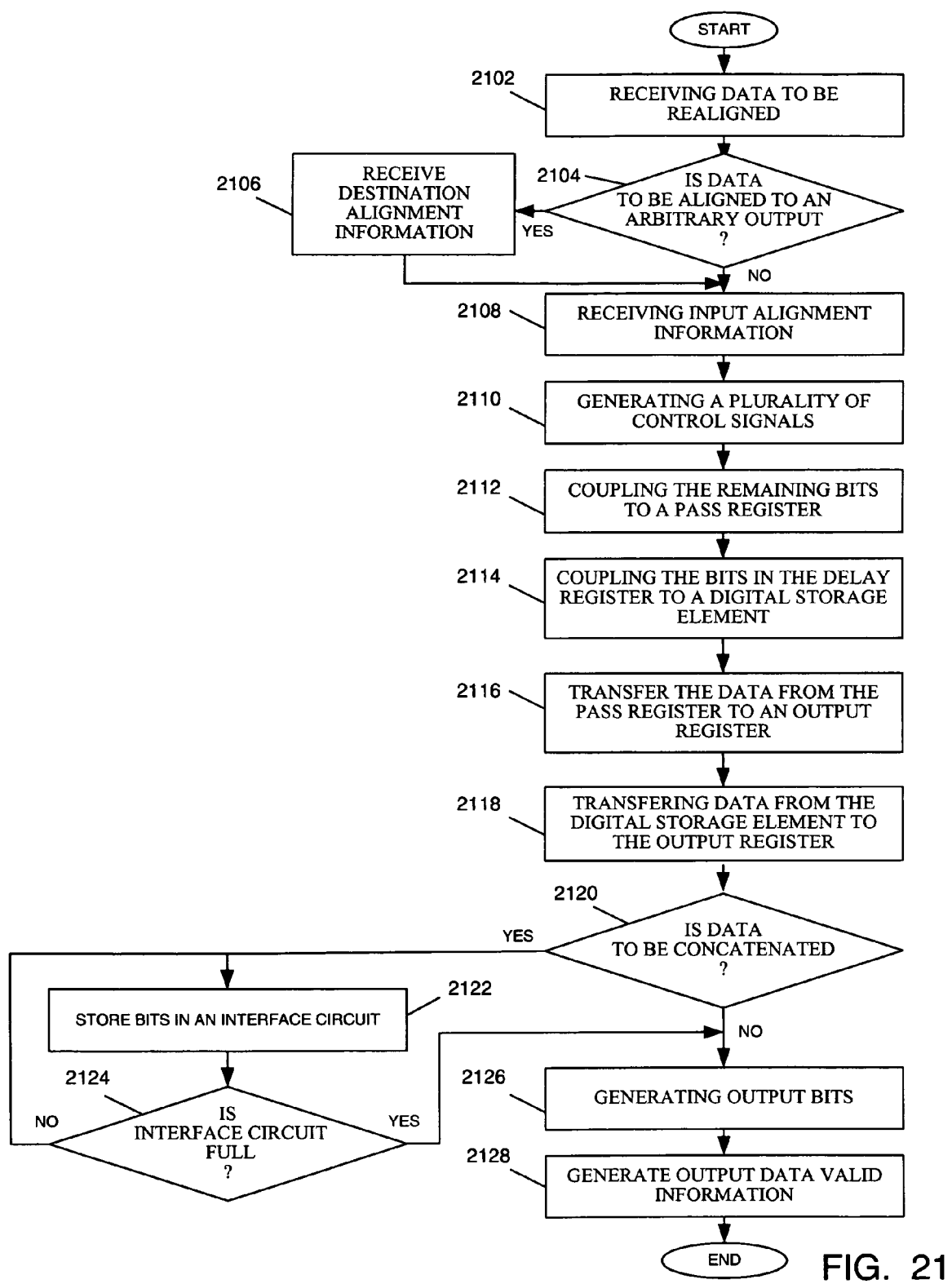
FIG. 21 is a flow chart showing a method of concatenating realigned data by employing ports and registers according to an embodiment of the present invention.

Turning now to FIG. 21, a flow chart shows a method of concatenating realigned data by employing multiplexers according to an embodiment of the present invention. Data to be realigned is received at a step 2102. It is then determined whether the data to be realigned is to be aligned to an arbitrary output at a step 2104. If so, destination alignment information is received at a step 2106. Input alignment information is then received at a step 2108. A plurality of control signals are then generated at a step 2110. The remaining bits are coupled to pass register at a step 2112. The bits in the delay register are coupled to a digital storage element at a step 2114. The data from the pass register is transferred to an output register at a step 2116. The data from the digital storage element is also transferred to the output register at a step 2118. It is then determined whether data is to be concatenated at a step 2120. If so, data is stored in an interface circuit at a step 2122. It is then determined whether the interface circuit is full at a step 2124. If so, the bits in the interface circuit are generated at a step 2126. Finally, output data valid information is generated at a step 2128.

The various embodiments of the present invention could be implemented in the form of VHDL design modules that are optimized for, but not limited to, implementation within a Field Programmable Gate Array (FPGA) such as the Virtex-II series of FPGAs available from Xilinx, Inc. of San Jose, Calif. Although the embodiments and examples of the present invention relate to a 64-bit wide data bus that is Big-endian in the way the microprocessor addressing mode corresponds to the byte lane assignments during data transfers, where the bits are numbered from 0 being the most significant bit to bit 63 being the least significant bit, the concepts and design approach for the invention can be applied to most data transfer buses regardless of bit width, endiness, or bit numbering.

It can therefore be appreciated that the new and novel programmable logic device and method of realigning data has been described. It will be appreciated by those skilled in the art that numerous alternatives and equivalents will be seen to exist which incorporate the disclosed invention. As a result, the invention is not to be limited by the foregoing embodiments, but only by the following claims.

The invention claimed is:

1. A method of realigning data, said method comprising the steps of:
   determining a data alignment of input data comprising a plurality of input bytes coupled to a predetermined number of byte lanes;
   generating an input alignment signal indicating a shift required to realign said plurality of input bytes;
   coupling input bytes of said plurality of input bytes to a delay multiplexer and a pass multiplexer;
   configuring said delay multiplexer and said pass multiplexer according to a shifting configuration based upon said input alignment signal to selectively transfer input data;
   realigning said input bytes of said plurality of input bytes using said delay multiplexer and said pass multiplexer based upon said shifting configuration; and
   outputting said realigned data comprising a predetermined number of bytes corresponding to said predetermined number of byte lanes.

2. The method of claim 1 wherein said step of determining a data alignment of input data comprises a step of determining misaligned data.

3. The method of claim 1 wherein said step of configuring said delay multiplexer and said pass multiplexer to selectively transfer input data comprises a step of configuring programmable hardware to generate an arbitrary byte alignment of said output.

4. The method of claim 1 wherein said step of configuring said delay multiplexer and said pass multiplexer to selectively transfer input data comprises a step of configuring programmable hardware to generate a fixed byte alignment of said output.

5. The method of claim 1 further comprising a step of concatenating a second plurality of input bytes with said plurality of input bytes.

6. A method of realigning data, said method comprising the steps of:
   determining a data alignment of input data comprising a plurality of input bytes coupled to a predetermined number of byte lanes;
   coupling input bytes of a plurality of input bytes to a delay multiplexer and a pass multiplexer;
   configuring said delay multiplexer and said pass multiplexer according to a shifting configuration to selectively transfer said input data to align said input data;
   realigning said input bytes of said plurality of input bytes using said delay multiplexer and said pass multiplexer based upon said shifting configuration;
   generating an output word comprising a predetermined number of bytes corresponding to the predetermined number of byte lanes;
   concatenating a plurality of output words having said predetermined number of bytes; and
   outputting said realigned data.

7. The method of claim 6 further comprising storing a last valid data state to a register.

8. The method of claim 7 further comprising coupling a valid output data byte to said register.

9. The method of claim 6 further comprising receiving a valid input data bit for each byte of input data.

10. The method of claim 6 further comprising coupling a destination alignment signal to a multiplexer control circuit.

11. The method of claim 10 further comprising coupling a data alignment initialization signal to said multiplexer control circuit.

12. The method of claim 11 further comprising generating multiplexer control signals based upon said destination alignment signal and said data alignment initialization signal.

* * * * *